USOO5199741A

United States Patent [19]
Swann et al.

[11] Patent Number: 5,199,741
[45] Date of Patent: Apr. 6, 1993

[54] METHOD OF ASSEMBLING AN INFLATOR

[75] Inventors: Timothy A. Swann; John P. O'Loughlin, both of Mesa; Jerome W. Emery, Tempe, all of Ariz.

[73] Assignee: TRW Inc., Lyndhurst, Ohio

[21] Appl. No.: 629,229

[22] Filed: Dec. 18, 1990

[51] Int. Cl.$^5$ .............................................. B60R 21/26
[52] U.S. Cl. ...................... 280/740; 102/531
[58] Field of Search ............... 280/743, 741, 740, 742, 280/728, 730, 731, 736; 29/469, 890.09, DIG. 48; 102/530, 531; 422/164, 165, 166

[56] References Cited

U.S. PATENT DOCUMENTS

| | | | |
|---|---|---|---|
| 3,878,969 | 4/1975 | Prochazka et al. | 102/531 |
| 3,958,949 | 5/1976 | Plantif et al. | 102/531 |
| 3,985,076 | 10/1976 | Schneiter et al. | 280/741 |
| 4,131,299 | 12/1978 | Ono et al. | 280/736 |
| 4,278,638 | 4/1981 | Nilsson et al. | 280/736 |
| 4,296,084 | 10/1981 | Adams et al. | 280/731 |
| 4,380,346 | 4/1983 | Davis et al. | 280/736 |
| 4,530,516 | 7/1985 | Adams et al. | 280/741 |
| 4,561,675 | 12/1985 | Adams et al. | 280/734 |
| 4,902,036 | 2/1990 | Zander et al. | 280/736 |
| 4,907,819 | 3/1990 | Cuevas | 280/743 |
| 5,000,479 | 3/1991 | Werner et al. | 280/741 |
| 5,003,887 | 4/1991 | Unterforsthuber et al. | 280/742 |
| 5,004,586 | 4/1991 | Hayashi et al. | 280/741 |
| 5,048,862 | 9/1991 | Bender et al. | 280/741 |
| 5,062,367 | 11/1991 | Hayashi et al. | |

FOREIGN PATENT DOCUMENTS

| | | | |
|---|---|---|---|
| 2-155859 | 6/1990 | Japan | 280/736 |
| 2022194 | 3/1982 | United Kingdom | 280/742 |

Primary Examiner—Karin L. Tyson
Attorney, Agent, or Firm—Tarolli, Sundheim & Covell

[57] ABSTRACT

An inflator for inflating a vehicle occupant restraint is assembled by welding various components of the inflator together, inserting a canister of gas generating material into the inflator, and then welding a closure member to the other components of the inflator. The step of welding the closure member to the other components of the inflator is the only welding step which is performed after inserting the canister of gas generating material. Prior to insertion of the canister of gas generating material, an end wall and a flange of a combustion cup are positioned in abutting engagement with an end wall and a flange of a diffuser cup. The end walls and flanges of the combustion and diffuser cups are welded together. An initiator assembly for igniting the gas generating material in the canister is connected with the closure member. After the initiator assembly has been connected with the closure member, the closure member is positioned to block the open end of the combustion cup in which the canister of gas generating material is disposed.

29 Claims, 4 Drawing Sheets

METHOD OF ASSEMBLING AN INFLATOR

BACKGROUND OF THE INVENTION

1. Technical Field

The present invention relates to a new and improved method of assembling an inflator for inflating a vehicle occupant restraint. Specifically, the invention relates to a method of assembling an inflator which contains material for generating gas to inflate an air bag.

2. Description of the Prior Art

A known inflator which contains material for generating gas to inflate an air bag is disclosed in U.S. Pat. No. 4,902,036. This inflator includes a base and a diffuser which are formed of stainless steel. The base and diffuser define a chamber in which a canister of gas generating material is disposed. The base and diffuser are joined at peripheral mounting flanges. The base and diffuser are also interconnected by a center post and a plurality of rivets which extend through the base and diffuser.

Although this known inflator is generally satisfactory in its mode of operation, the method of assembling the known inflator could be improved to minimize the cost of components of the inflator and to improve the ease with which the inflator is assembled. Also, in the method of assembly of the known inflator, care must be taken to avoid the possibility of unintended ignition of the gas generating material in the inflator.

SUMMARY OF THE INVENTION

The present invention provides an improved method of assembling an inflator which inflates a vehicle occupant restraint, such as an air bag. When the inflator is to be assembled, a plurality of inflator components are interconnected. Thereafter, gas generating material is inserted into a chamber in the inflator. A closure member or cover closes the chamber in the inflator. The cover is welded to the other components of the inflator with a single weld. In order to minimize the possibility of unintended ignition of gas generating material used in the inflator, the step of welding the closure member to the interconnected components is the only welding step performed after inserting the gas generating material into the inflator.

The inflator includes a combustion cup which receives the gas generating material and a diffuser cup which cooperates with the combustion cup to form a diffuser chamber. Prior to insertion of the gas generating material into the inflator, end walls of the combustion and diffuser cups are welded together. In addition, flanges on the combustion and diffuser cups are welded together.

The gas generating material is inserted into a chamber in the combustion cup. Thereafter, a closure member, to which an initiator assembly is connected, is positioned to close the chamber in the combustion cup. By connecting the initiator assembly with the closure member before the closure member is positioned to close the chamber in the combustion cup, the initiator assembly and closure member are simultaneously positioned relative to other components of the inflator.

BRIEF DESCRIPTION OF THE DRAWINGS

The foregoing and other features of the invention will become apparent to one skilled in the art upon a consideration of the following description of the invention with reference to the accompanying drawings, in which.

DESCRIPTION OF ONE EMBODIMENT OF THE INVENTION

Figure 1:
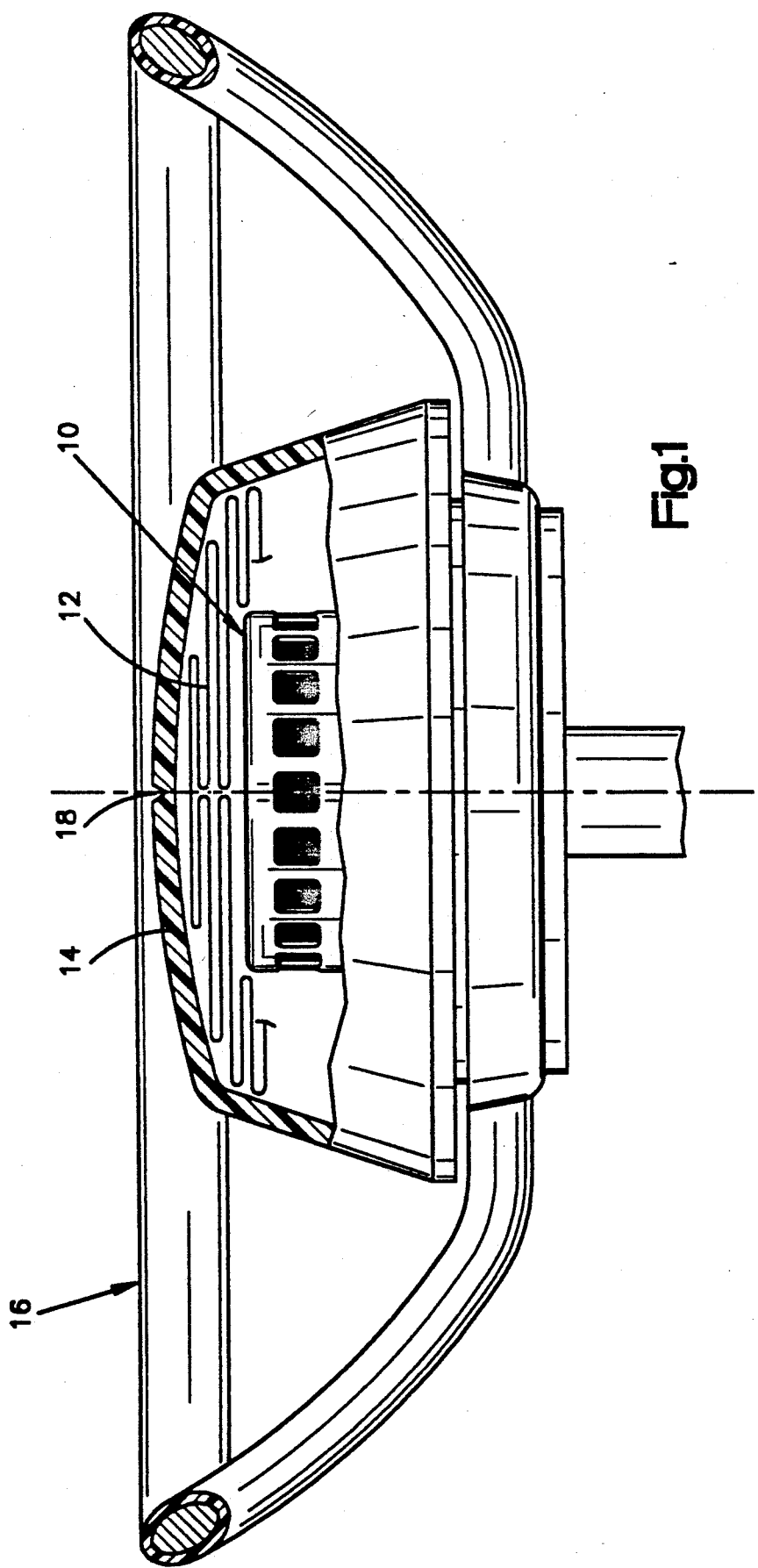
FIG. 1 is a fragmentary sectional view of a safety apparatus constructed in accordance with the present invention and mounted on a steering wheel of a vehicle.

The present invention relates to an air bag inflator and particularly to an inflator for inflating an air bag to protect the driver of a vehicle The present invention is applicable to various inflator constructions. As representative of the present invention, FIG. 1 illustrates an inflator 10. An air bag 12 is folded around the inflator 10. A cover 14 encloses the air bag 12 and the inflator 10. The inflator 10, the air bag 12, and the cover 14 are components of a module which is mounted on a vehicle steering wheel 16.

Upon the occurrence of sudden vehicle deceleration, such as occurs in a collision, the inflator 10 is energized and produces a large volume of gas. The gas from the inflator 10 expands the air bag 12. As the air bag 12 starts to expand, it breaks weakened portions in the cover 14. One of the weakened portions is designated 18 in FIG. 1. As the air bag 12 continues to expand, it moves into the space between the driver of the vehicle and the steering wheel 16 to restrain movement of the driver, as is known.

The inflator 10 (FIG. 2) includes a housing 40. The housing 40 is made of three pieces, namely, a one-piece diffuser cup 42, a one-piece combustion cup 44, and a one-piece combustion chamber cover 46 (FIGS. 3 and 4). The diffuser cup 42, the combustion cup 44, and the combustion chamber cover 46 are each made from one piece of sheet metal, such as UNS S30100 stainless steel.

The diffuser cup 42 is generally cup-shaped, is a single piece of sheet metal, and has a cylindrical side wall 50 extending around the central axis 52 of the inflator 10. The side wall 50 extends between a flat upper annular end wall 54 and a flat lower annular flange 56. The annular flange 56 extends radially outward from an end of the diffuser cup opposite from the end wall 54 and is coaxial with the side wall 50. A cylindrical inner annular surface 55 on the upper end wall 54 of the diffuser cup 42 defines a central circular opening 57 in the upper end wall 54 which minimizes the weight of the diffuser cup. The end wall 54 and the flange 56 are parallel to each other and perpendicular to the axis 52. An annular array of gas outlet openings 58 extends circumferentially around an upper portion of the diffuser cup side wall 50.

Figure 2:
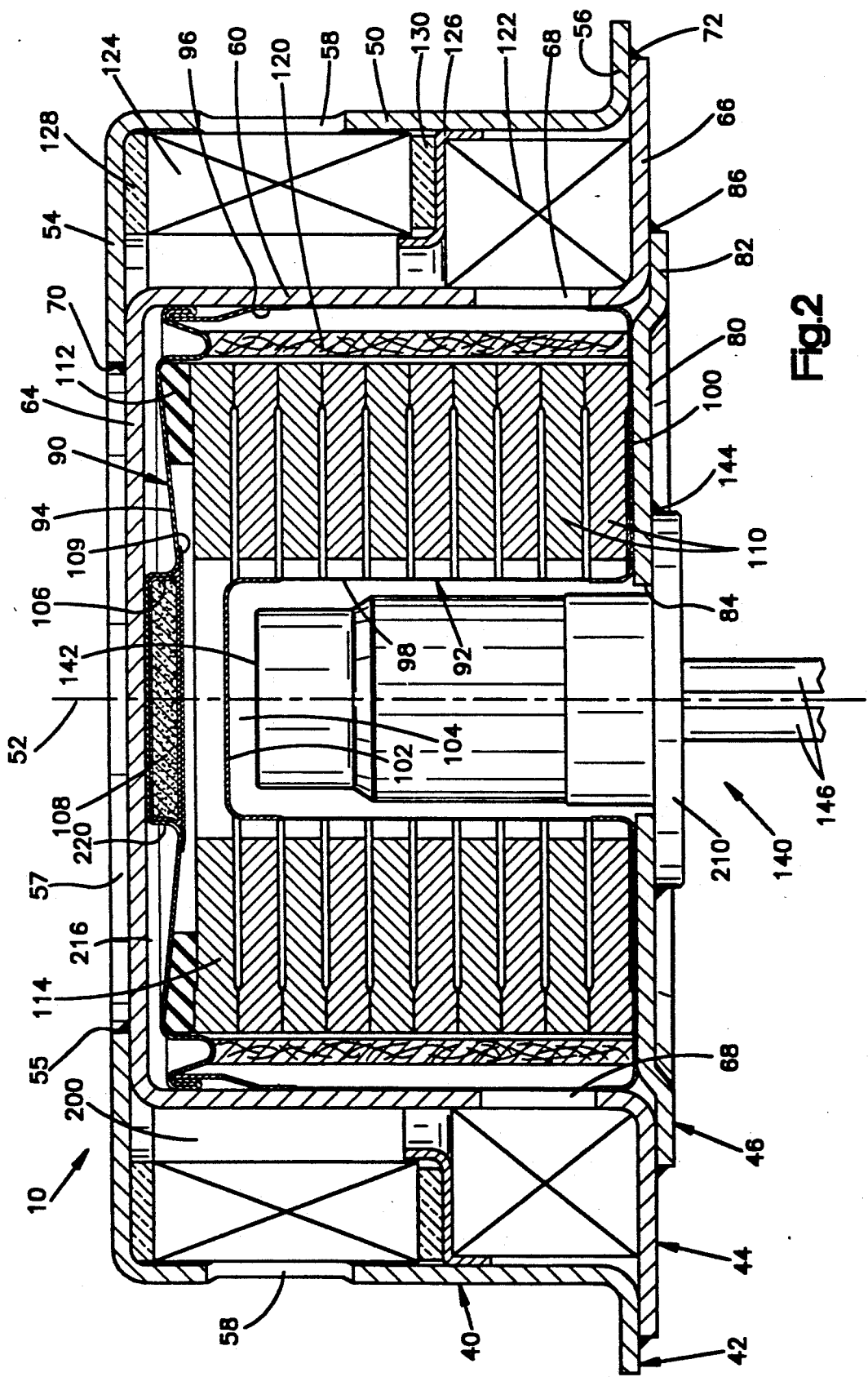
FIG. 2 is an enlarged sectional view illustrating the construction of an inflator used in the safety apparatus of FIG. 1.
Figure 3:
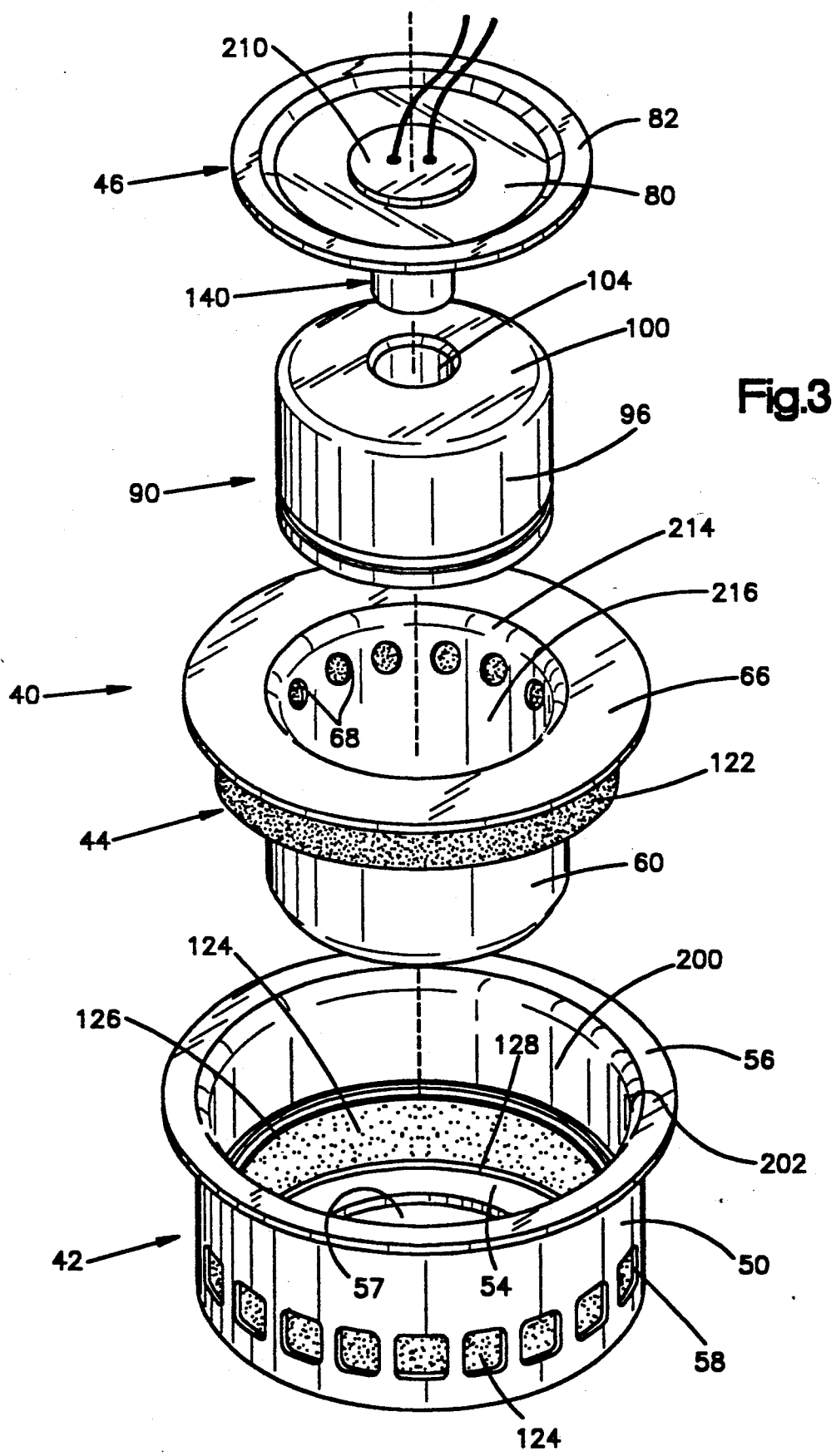
FIG. 3 is an exploded perspective illustration of the components of the inflator prior to assembly of the inflator, the inflator components being shown in an upside down orientation.
Figure 4:
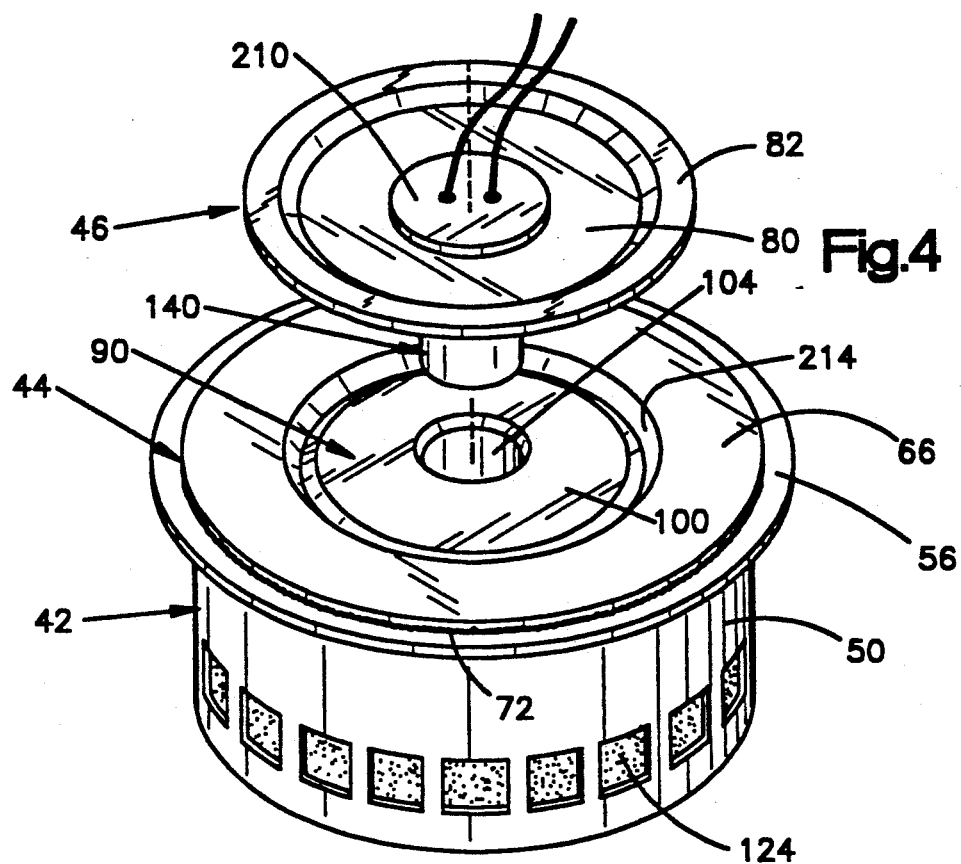
FIG. 4 is a perspective illustration, generally similar to FIG. 3, illustrating the manner in which a canister of gas generating material is inserted into a chamber in a combustion cup after the combustion cup has been connected with a diffuser cup.

The combustion cup 44 is generally cup-shaped, is a single piece of sheet metal, and is disposed inside the diffuser cup 42 (FIGS. 2 and 3). The combustion cup 44 has a cylindrical side wall 60 extending around the axis 52. The cylindrical side wall 60 extends between a flat imperforate circular upper end wall 64 and a flat lower annular flange 66. The flange 66 is disposed in a coaxial relationship with the cylindrical side wall 60 and extends radially outwardly from an end of the side wall 60 opposite from the end wall 64. The upper end wall 64 and the lower flange 66 are parallel to each other and perpendicular to the axis 52. An annular array of openings 68 extends circumferentially around a lower portion of the combustion cup side wall 60.

The upper end wall 64 of the combustion cup 44 is welded, with a circular continuous weld, to the annular surface 55 on the upper end wall 54 of the diffuser cup 42 at a weld location 70, preferably by laser welding. The combustion cup flange 66 is welded with a circular continuous weld to the diffuser cup flange 56 at a weld location 72, also preferably by laser welding.

The cover 46 is also formed from a single piece of sheet metal. The combustion chamber cover 46 is a generally flat circular metal piece having a circular center portion 80 and a parallel but slightly offset annular outer flange 82. A circular opening 84 is located in the center portion 80 of the chamber cover 46. The opening 84 is coaxial with the diffuser and combustion cup side walls 50 and 60. The outer flange 82 of the chamber cover 46 overlaps the combustion cup flange 66 and is welded with a circular continuous weld to the combustion cup flange 66 at a circumferential weld location 86, again preferably by laser welding. The circular weld locations 70, 72 and 86 are coaxial with the central axis 52 of the inflator. The welds may be formed by a Rofin-Sinar 850 CO$_2$ Laser.

A hermetically sealed canister 90 (FIG. 2) is disposed in the combustion cup 44. The canister 90 is made of two pieces, namely, a lower canister section 92 and a cover 94. The radially outer edge of the canister cover 94 is crimped to an adjacent edge of the canister lower section 92 to seal the canister 90 hermetically. The canister 90 is preferably made of relatively thin aluminum.

The canister lower section 92 (FIG. 2) has a cylindrical outer side wall 96 adjacent to and inside the combustion cup side wall 60. The side wall 96 has a reduced thickness in the area adjacent the openings 68 in the combustion cup side wall 60. The canister lower section 92 also has a cylindrical inner side wall 98 spaced radially inwardly from the outer side wall 96. The side wall 98 has a reduced thickness in the area adjacent an igniter 142.

A flat ring-shaped lower wall 100 of the canister lower section 92 interconnects the outer side wall 96 and the inner side wall 98. A circular inner top wall 102 of the canister lower section 92 extends radially inwardly from and caps the inner side wall 98. The inner top wall 102 and the cylindrical inner side wall 98 define a downwardly opening central recess 104 in the canister 90.

The canister cover 94 is generally circular in shape A recess 106 is located in the center of the canister cover 94. A packet 108 of auto ignition material is located in the recess 106 and held in the recess 106 by a piece of aluminum foil tape 109.

A plurality of annular disks 110 of gas generating material are stacked atop each other within the canister 90. An annular cushion 112 is disposed between the uppermost gas generating disk 114 and the inside of the canister cover 94. The disks 110 are made of a known material which, when ignited, generates nitrogen gas.

Although many types of gas generating material could be used, suitable gas generating materials are disclosed in U.S. Pat. No. 3,895,098.

An annular prefilter 120 is disposed in the canister 90. The prefilter 120 is located radially outward of the gas generating disks 110 and radially inward of the outer side wall 96 of the canister 90. A small annular space exists between the prefilter 120 and the outer side wall 96.

An annular slag screen or filter indicated schematically at 122 is located in the diffuser cup 42, outside of the combustion cup 44. The slag filter 122 is disposed radially outward of the openings 68 and lies against the combustion cup side wall 60. However, the slag filter 122 could be spaced away from the openings 68 in the combustion cup side wall 60.

An annular final filter assembly indicated schematically at 124 is located inside the diffuser cup 42 above the slag screen 122. The final filter assembly 124 is radially inward of the gas outlet openings 58 in the side wall 50 of tho diffuser cup 42. The final filter assembly 124 is a plurality of layers of various materials. The layers extend around the diffuser cup side wall 50 and are located inside the side wall. The detailed structure of the final filter assembly 124 does not form a part of the present invention and therefore will not be described in detail.

An annular filter shield 126 projects radially inwardly from the diffuser cup side wall 50 and separates the final filter assembly 124 and the slag filter 122. An annular graphite seal 128 seals the gap between the upper edge of the final filter assembly 124 and the inside of the diffuser cup upper end wall 54. Another annular graphite seal 130 seals the gap between the lower edge of the final filter assembly 124 and the upper side of the filter shield 126.

The inflator 10 includes an initiator assembly 140. The initiator assembly 140 projects through the opening 84 in the chamber cover 46 into the central recess 104 of the canister 90. The initiator assembly 140 is welded with a continuous weld, preferably a laser weld, to the center portion 80 of the chamber cover 46 at a circumferential weld location 144.

The initiator assembly 140 includes the ignite 142 and a weld adaptor 210. The igniter 142 includes a pair of wire leads 146 which extend outwardly from the initiator assembly 140. The wire leads 146 are connectable to a collision sensor (not shown). Within the igniter, the wire leads 146 are connected to a resistance wire embedded in an ignition material. The igniter 142 may be of any suitable well known construction. A thin plastic film (not shown) is located on the outside of the upper portion of the igniter 142, to prevent metal-to-metal contact which could ground the igniter 142 and disable the inflator 10.

Upon the occurrence of a collision or other sudden vehicle deceleration, the collision sensor closes an electrical circuit. An electrical current then flows through the wire leads 146 to the igniter 142. The resistance wire sets off the ignition material which ignites a charge in the igniter 142. Ignition of the charge forms hot particles and gas products which flow outwardly from the igniter 142 and rupture the inner top wall 102 and the inner side wall 98 of the canister 90. The hot particles and gas from the igniter 142 ignites the disks 110 of gas generating material. The disks 110 of gas generating material rapidly produce a large volume of another hot gas.

The pressure of the gas acts on the cylindrical side wall 96 of the canister 90, forcing the side wall 96 radially outwardly against the combustion cup side wall 60. This results in the thin side wall 96 of the canister 90 being ruptured or blown out at the openings 68 in the combustion cup side wall 60. The reduced thickness of the side wall 96 adjacent the openings 68 allows this portion of the side wall 96 to rupture in preference to other portions at a desired pressure. The gas generated by burning of the disks 110 then flows radially outwardly through the prefilter 120. The prefilter 120 removes from the flowing gas some combustion products of the initiator assembly 140 and of the gas generating disks 110. The prefilter 120 also cools the flowing gas. When the gas cools, molten products are plated onto the prefilter. The gas flows through the openings 68 and into the slag screen or filter 122.

The slag screen or filter 122 removes and traps large particles from the flowing gas. The slag filter 122 also cools the flowing gas. When the gas cools, molten combustion products such as metal are plated onto the slag filter 122. The filter shield 126 between the slag filter 122 and the final filter assembly 124 causes turbulent flow of gas to occur in and around the slag screen 122. The turbulent gas flow promotes the retention of relatively heavy particles in the slag filter 122 and in the lower portion of the diffuser cup 42.

The gas flows axially upwardly from the slag screen or filter 122 to the final filter assembly 124. The gas then flows radially outwardly through the final filter assembly 124 which removes small particles from the gas. The final filter assembly 124 also further cools the gas so that molten products in the gas may deposit on parts of the final filter assembly 124. The annular array of gas outlet openings 58 directs the flow of gas into the air bag 12 to inflate the air bag 12.

When the inflator 10 is to be assembled, the diffuser cup 42 is positioned in the upside down orientation shown in FIG. 3. With the diffuser cup 42 in the upside down orientation of FIG. 3, a cylindrical diffuser cup chamber 200 is readily accessible through a circular opening 202 in the end of the diffuser cup adjacent the flange 56.

The seal 128 and the annular final filter assembly 124 are inserted into the diffuser cupchamber 200 through the opening 202 (FIG. 3). The seal 128 is moved into abutting engagement with an upwardly facing inner surface of the diffuser cup end wall 54. The final filter assembly 124 is placed on top of the seal 128.

After the seal 128 and the final filter assembly 124 have been positioned in the diffuser cup chamber 200, the seal 130 is positioned in the diffuser cup chamber 200 on the final filter assembly. Thereafter, the annular filter shield 126 is press fit into the diffuser cup chamber 200 in abutting engagement with seal 130. There is a small amount of interference between the radially outer surface of the filter shield 126 and the radially inner surface of the diffuser cup side wall 50. Therefore, the filter shield 126 is resiliently deflected as it is pressed into the diffuser cup chamber 200. The filter shield 126 is held in place by friction between the radially outer surface of the filter shield and the radially inner surface of the diffuser cup side wall 50.

If desired, the filter shield 126 could be assembled with the seals 130 and 128 and the final filter assembly 124 before being inserted into the diffuser cup 42. This would enable the filter shield 126, seal 130, and the final filter assembly 124 to be simultaneously moved into position in the diffuser cup chamber 200.

The annular slag screen or filter 122 is press fit onto the outside of the combustion cup 44 (FIG. 3) before the combustion cup is inserted into the diffuser cup 42. The friction engagement between the cylindrical radially inner surface of the slag filter 122 and the radially outer surface of the side wall 60 of the combustion cup 44 holds the slag filter 122 in place. A radially extending annular upper (as viewed in FIG. 3) surface of the slag filter 122 is disposed in abutting engagement with a downwardly facing, radially extending surface of the combustion cup flange 66.

Once the slag screen or filter 122 has been positioned on the combustion cup 44 and the final filter assembly 124, seals 128 and 130, and filter shield 126 have been positioned in the diffuser cup 42, the combustion cup 44 is telescopically inserted into the diffuser cup 42. As the combustion cup 44 moves into the diffuser cup 42, the lower or leading end of the slag filter 122 moves into abutting engagement with the filter shield 126. The combustion cup side wall 60 extends through the final filter assembly 124. The cylindrical combustion cup side wall 60 has an outer diameter which is less than the inside diameter of the final filter assembly 124 so that there is space between the combustion cup side wall 60 and the final filter assembly 124 (FIG. 2).

As the combustion cup 44 is inserted into the diffuser cup 42, the imperforate circular end wall 64 (FIG. 2) of the combustion cup 44 moves into abutting engagement with the annular end wall 54 of the diffuser cup 42. At the same time, a flat radially extending lower (as viewed in FIG. 3) surface of the combustion cup flange 66 moves into abutting engagement with a radially extending and upwardly facing (as viewed in FIG. 3) surface of the diffuser cup flange 56. Thus, the diffuser cup 42 and combustion cup 44 are positioned relative to each other by abutting engagement between the end walls 54 and 64 and between the flanges 56 and 66. Although it is preferred to insert the combustion cup 44 into the diffuser cup 42 by moving the combustion cup relative to the diffuser cup, the diffuser cup could be moved relative to the combustion cup, if desired.

Once the diffuser cup 42 and combustion cup 44 have been positioned relative to each other, the end walls 54 and 64 of the diffuser and combustion cups are welded together. Specifically, a continuous circular weld is formed at weld location 70 in an area of overlapping abutting engagement between the end walls 54 and 64. The continuous circular weld at location 70 (FIG. 2) interconnects the diffuser cup and combustion cup end walls 54 and 64 at a location which is disposed radially inwardly of the cylindrical combustion cup side wall 60. The combustion cup end wall 64 is exposed through the circular opening 57 in the diffuser cup end wall 54.

The flanges 56 and 66 on the diffuser cup 42 and combustion cup 44 are welded together in overlapping abutting engagement with each other. The continuous circular weld at weld location 72 (FIG. 2) is formed between the circular peripheral surface of the combustion cup flange 66 and a radially extending surface of the diffuser cup flange 56. The welds at locations 70 and 72 thus interconnect the diffuser and combustion cups to form a subassembly, with the slag filter 122 and final filter 124. At this time, the canister 90, initiator 140, and cover 46 are spaced from the diffuser and combustion cups 42 and 44.

The combustion cup 44 defines a cylindrical chamber 216 which is accessible through a circular opening 214 in the end of the combustion cup adjacent the flange 66. The sealed canister 90 containing the gas generating material is inserted through the opening 214 (FIG. 3) into the chamber 216. As the canister 90 is moved into the chamber 216, a generally cylindrical projection 220 (FIG. 2) of the canister cover 94 moves into abutting engagement with a radially extending inner surface of the combustion cup end wall 64. The projection 220 defines the recess 106 in the canister cover 94.

Figure 5:
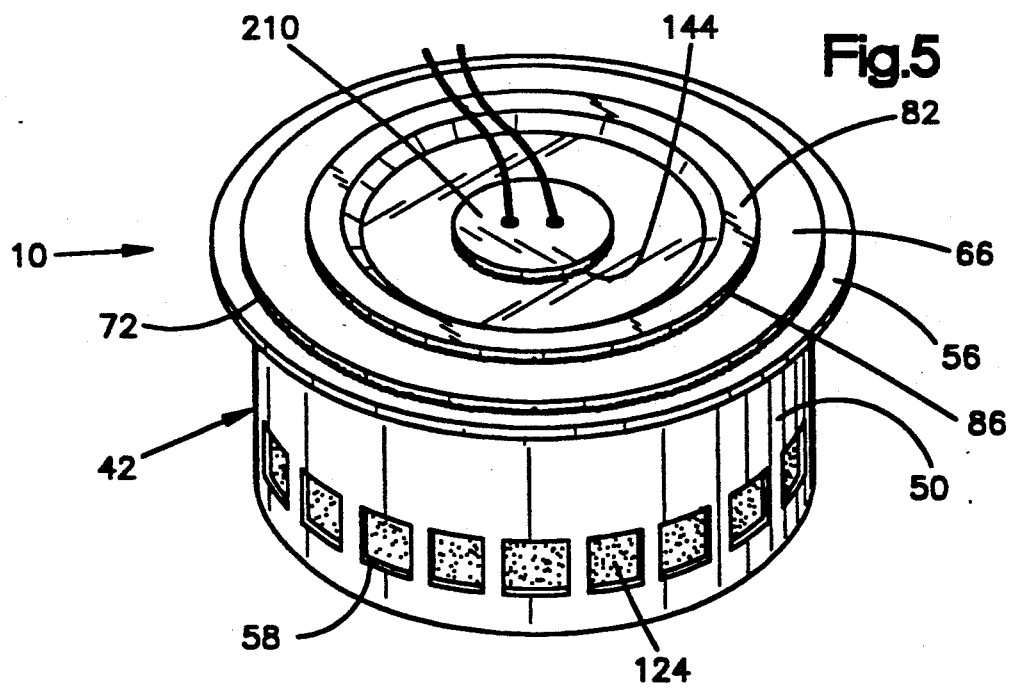
FIG. 5 is a perspective illustration of the assembled inflator.

The initiator assembly 140 is welded to the cover 46 while the cover is spaced from the diffuser cup 42 and combustion cup 44. The weld at location 144 (FIG. 2) is formed between a radially extending weld adaptor 210 at one end of the initiator assembly 140 and the central portion 80 of the cover 46. The cover 46 and initiator assembly 140 are then positioned relative to the canister 90 and combustion cup 44. Specifically, the initiator assembly 140 is telescopically positioned in the recess 104 in the canister 90. As the initiator assembly 140 is fully inserted into the canister recess 104, the cover 46 moves into engagement with the canister end wall 100. The cover 46 is then pressed downwardly (as viewed in FIGS. 4 and 5) to move the cover flange 82 into abutting engagement with the combustion cup flange 66. As this occurs, the canister end wall 94 is deflected inwardly (downwardly in FIG. 2) and the cushion 112 is compressed against the uppermost disk 114 of gas generating material.

Although the cover 46 and initiator assembly 140 have been described as being positioned relative to the canister 90 after the canister is inserted into the combustion cup 44, the initiator assembly 140 could be positioned in the canister recess 104 before the canister is inserted into the combustion cup. After the initiator assembly 140 is positioned in the canister recess 104, the canister 90, and initiator assembly 140 could be inserted together into the combustion cup chamber 216. Regardless of which order of assembly is used, the cover 46 is moved into a position closing the opening 214 to the combustion cup chamber 216.

Once the cover flange 82 has been positioned in overlapping engagement with the flange 66 on the combustion cup 44, the weld (FIG. 2) is formed at weld location 86. The weld at location 86 connects the cover 46 to the combustion cup flange 66. The weld 86 between the cover 46 and combustion cup flange 66 is the only weld which is formed after the canister 90 of gas generating material has been inserted into the combustion cup 44. By forming only a single weld after the gas generating material has been placed in the combustion cup 44, the possibility of igniting the gas generating material during assembly of the inflator 10 is minimized. Once the weld at location 86 has been formed, the inflator 10 (FIG. 5) has been completely assembled. It should be noted that although the welds at locations 70, 72, 86 and 144 are described as single welds, this description is intended to encompass multiple passes of a welding machine and/or multiple layers of weld material at each location.

From the above description of the invention, those skilled in the art will perceive improvements, changes and modifications. Such improvements, changes and modifications within the skill of the art are intended to be covered by the appended claims.

We claim:

1. A method of assembling an inflator for inflating a vehicle occupant restraint, said method comprising the steps of:
   interconnecting (a) a diffuser having openings for conducting fluid flow away from the diffuser into the occupant restraint and (b) a combustion cup having openings for conducting fluid flow from a chamber in the combustion cup to a chamber in the diffuser;
   thereafter, positioning a gas generating material for producing gas in a quantity sufficient to inflate fully the occupant restraint in the chamber in the combustion cup; and
   closing the chamber in the combustion cup by moving a closure member relative to the interconnected diffuser and combustion cup into a position at one end of the chamber in the combustion cup and welding the closure member to the interconnected combustion cup and diffuser with a single weld.

2. A method as set forth in claim 1 wherein said step of welding the closure member to the interconnected combustion cup and diffuser with a single weld is the only welding step performed after positioning the gas generating material in the combustion cup.

3. A method as set forth in claim 1 wherein said step of interconnecting a diffuser and a combustion cup is performed after a filter element is located in the chamber in the diffuser.

4. A method as set forth in claim 1 wherein said step of positioning gas generating material for producing gas to inflate the occupant restraint in the chamber in the combustion cup includes positioning a canister of gas generating material in the chamber in the combustion cup, said method further comprising the steps of connecting an initiator assembly to the closure member prior to performing said step of positioning the closure member at one end of the chamber in the interconnected combustion cup, and positioning an initiator assembly in a recess in the canister prior to performing said step of welding the closure member to the interconnected combustion cup and diffuser with a single weld.

5. A method as set forth in claim 4 wherein said step of connecting an initiator assembly to the closure member prior to performing said step of positioning the closure member at one end of the chamber in the interconnected combustion cup includes providing a single weld.

6. A method as set forth in claim 1 further comprising the steps of positioning the combustion cup and diffuser in a telescopic relationship and disposing a filter element between the combustion cup and diffuser, said step of interconnecting a diffuser and a combustion cup including welding the combustion cup and diffuser together after positioning them in a telescopic relationship.

7. A method as set forth in claim 1 wherein said step of positioning gas generating material in the chamber in the combustion cup includes positioning a sealed canister containing gas generating material in the chamber in the combustion cup, said method further comprising the step of positioning the initiator assembly outside the sealed canister containing gas generating material, said step of welding a closure member to the interconnected combustion cup and diffuser with a single weld including welding the closure member to the interconnected combustion cup and diffuser with the initiator assembly disposed adjacent to and outside of the sealed canister.

8. A method as set forth in claim 1 further comprising the steps of positioning a first annular filter element in the chamber in the diffuser, positioning a second annular filter element around the outside of the combustion cup, and positioning the combustion cup and the second filter element in the diffuser with the second filter element extending around the outside of the combustion cup, said step of interconnecting the combustion cup and diffuser being performed after performing said step of positioning the combustion cup and second filter element in the diffuser.

9. A method as set forth in claim 8 wherein said step of interconnecting the combustion cup and diffuser includes welding the diffuser to the combustion cup.

10. A method as set forth in claim 9 wherein said step of positioning gas generating material in the chamber in the combustion cup includes positioning a canister of gas generating material in the chamber in the combustion cup, and wherein said step of welding a closure member to the interconnected combustion cup and diffuser with a single weld includes welding the closure member to the combustion cup.

11. A method as set forth in claim 1 wherein said combustion cup has a cylindrical side wall and an end wall extending radially inwardly from one end of the side wall and said diffuser has a cylindrical side wall and an end wall extending radially inwardly from one end of the diffuser side wall, said step of interconnecting a combustion cup and a diffuser comprising the step of positioning the combustion cup in the diffuser with a filter disposed between the side walls of the combustion cup and diffuser and with the end walls of the combustion cup and diffuser in overlapping engagement and the step of welding the end walls of the combustion cup and diffuser together.

12. A method as set forth in claim 11 wherein said step of welding a closure member to the interconnected combustion cup and diffuser includes welding the closure member to the combustion cup.

13. A method of assembling an inflator for inflating a vehicle occupant restraint, said method comprising the steps of:
providing a combustion cup having a cylindrical side wall and an end wall extending radially inwardly from one end of the side wall, the combustion cup end wall having an inner major side surface and an outer major side surface, the combustion cup end wall and side wall defining a chamber for receiving gas generating material for producing gas in a quantity sufficient to inflate fully the vehicle occupant restraint;
providing a diffuser cup having a cylindrical side wall and an end wall extending radially inwardly from one end of the diffuser side wall, the diffuser cup end wall having an inner major side surface and an outer major side surface;
positioning the combustion cup inside the diffuser cup with a filter disposed between the side walls of the combustion and diffuser cups by moving the outer major side surface of the radially inward extending end wall of the combustion cup into overlapping abutting engagement with the inner major side surface of the radially inward extending end wall of the diffuser cup; and
welding and radially inward extending end walls of the combustion and diffuser cups together at an area of overlapping engagement of the end walls to close the filter inside the diffuser cup.

14. A method as set forth in claim 13 further comprising the steps of positioning a canister containing gas generating material in a chamber in the combustion cup through an opening in the combustion cup, blocking the opening in the combustion cup with a closure member, and welding the closure member to one of the cups.

15. A method as set forth in claim 14 wherein said step of welding the end walls of the combustion cup and diffuser cup together is performed prior to performing said step of positioning a canister containing gas generating material in the combustion cup, said step of welding the closure member to one of the cups being performed after performing said step of positioning a canister containing gas generating material in the combustion cup.

16. A method as set forth in claim 13 wherein said step of positioning the combustion cup in the diffuser cup with a filter disposed between the side walls of the combustion and diffuser cups includes positioning an annular filter in the diffuser cup with a radially outer surface of the filter in engagement with a radially inner surface of the diffuser cup side wall and, thereafter, telescopically positioning a portion of the combustion cup side wall in the filter.

17. A method as set forth in claim 13 wherein said step of positioning the combustion cup in the diffuser cup with a filter disposed between the side walls of the combustion and diffuser cups includes positioning an annular filter on the outside of the combustion cup and, thereafter, positioning a radially inner surface of the diffuser cup side wall around a radially outer surface of the filter.

18. A method as set forth in claim 13 wherein said step of positioning the combustion cup in the diffuser cup with a filter disposed between the side walls of the combustion and diffuser cups includes the steps of positioning a first annular filter element in the diffuser cup adjacent to the diffuser cup end wall, positioning a second annular filter element on the outside of the combustion cup with a radially inner surface of the second filter element adjacent to a radially outer surface of the combustion cup side wall, and, thereafter, positioning the combustion cup in the first filter element and positioning the second filter element in the diffuser cup.

19. A method of assembling an inflator for inflating a vehicle occupant restraint, said method comprising the steps of:
positioning a cylindrical combustion cup in a cylindrical diffuser cup having a plurality of radial openings for conducting fluid flow away form the diffuser cup with a filter disposed between side walls of the combustion and diffuser cups;
positioning a canister containing gas generating material in a chamber in the combustion cup through an opening in the combustion cup;
connecting an initiator assembly with a closure member;
moving the closure member relative to the diffuser cup and combustion cup to position the closure member to block the opening in the combustion cup after connecting the initiator assembly with the closure member; and
connecting the combustion cup, diffuser cup and closure member together.

20. A method as set forth in claim 19 wherein said step of moving the closure member to block the opening in the combustion cup includes positioning the initiator assembly in the combustion cup chamber with the initiator assembly disposed outside of the canister.

21. A method as set forth in claim 19 wherein said step of connecting the combustion cup, diffuser cup and closure member together includes the steps of (a) welding the combustion cup and diffuser cup together before positioning the canister containing gas generating material in the chamber in the combustion cup and (b) welding the closure member to the combustion cup with a single weld after welding the combustion cup and diffuser cup together, said step of welding the closure member to the combustion cup with a single weld being the only welding step performed after positioning the canister containing gas generating material in a chamber in the combustion cup.

22. A method of assembling an inflator for inflating a vehicle occupant restraint, said method comprising the steps of:
providing a combustion cup having a cylindrical side wall and an end wall extending radially inwardly from one end of the side wall;
providing a diffuser cup having a cylindrical side wall and an end wall extending radially inwardly from one end of the diffuser cup side wall;
positioning the combustion cup in the diffuser cup with a filter disposed between the side walls of the combustion and diffuser cups and with the end walls of the combustion and diffuser cups in engagement, said step of positioning the combustion cup in the diffuser cup including positioning the combustion cup in the diffuser cup with a flange at an end of the combustion cup side wall opposite from the one end of the combustion cup side wall in engagement with a flange at an end of the diffuser cup side wall opposite from the one end of the diffuser cup side wall;
welding the end walls of the combustion and diffuser cups together at an area of engagement of the end walls; and
welding the flanges of the combustion and diffuser cups together.

23. A method as set forth in claim 22 further comprising the steps of (a) positioning a canister containing gas generating material in a chamber in the combustion cup through an opening in the combustion cup after having performed said step of welding the end walls of the combustion and diffuser cups together and after having performed said step of welding the flanges of the combustion and diffuser cups together, (b) blocking the opening in the combustion cup with a closure member, and (c) welding the closure member to the flange on of the cups, said step of welding the closure member to the flange on one of the cups being the only welding step performed after positioning the canister of gas generating material in the combustion cup.

24. A method as set forth in claim 23 further comprising the step of connecting an initiator assembly with the closure member prior to performing said step of blocking the opening in the combustion cup with a closure member.

25. A method of assembling an inflator for inflating a vehicle occupant restraint, said method comprising the steps of:
positioning a combustion cup in a diffuser cup with a filter disposed between side walls of the combustion and diffuser cups, the combustion cup having a cylindrical side wall, an end wall extending radially inwardly from one end of the side wall and a flange extending radially outwardly from an end of the side wall opposite from the one end, the diffuser cup having a cylindrical side wall, an end wall extending radially inwardly from one end of the diffuser cup side wall and a flange extending radially outwardly from an end of the diffuser cup opposite from the one end;
positioning a canister containing gas generating material in a chamber in the combustion cup through an opening in the combustion cup;
connecting an initiator assembly with a closure member;
blocking the opening in the combustion cup with the closure member after connecting the initiator assembly with the closure member; and
connecting the combustion cup, diffuser cup and closure member together, said step of connecting the combustion cup, diffuser cup and closure member together including welding the end walls of the combustion and diffuser cups together and welding the flanges on the combustion and diffuser cups together.

26. A method as set forth in claim 25 wherein said step of connecting the combustion cup, diffuser cup and closure member together includes welding the closure member to the flange on one of the cups.

27. A method as set forth in claim 26 wherein said step of welding the end walls of the combustion cup and diffuser cup together and said step of welding the flanges on the combustion and diffuser cups together are performed prior to performing said step of positioning a canister containing gas generating material in the combustion cup, said step of welding the closure member to the flange on one of the cups being performed after said step of positioning the canister containing gas generating material in the combustion cup.

28. A method of assembling an inflator for inflating a vehicle occupant restraint, said method comprising the steps of:
interconnecting (a) a diffuser having openings for conducting fluid flow from a chamber in the diffuser and (b) a combustion cup having openings for conducting fluid flow from a chamber in the combustion cup to the chamber in the diffuser;
thereafter, positioning a gas generating material in the chamber in the combustion cup;
closing the chamber in the combustion cup by positioning a closure member at one end of the chamber in the combustion cup and welding the closure member to the interconnected combustion cup and diffuser with a single weld; and
connecting an initiator assembly to the closure member prior to performing said step of positioning the closure member at one end of the chamber in the interconnected combustion cup and diffuser;
said combustion cup having a cylindrical side wall and an end wall extending radially inwardly from one end of the side wall and said diffuser having a cylindrical side wall and an end wall extending radially inwardly from one end of the diffuser side wall, said step of interconnecting a combustion cup and a diffuser comprising the step of positioning the combustion cup in the diffuser with a filter disposed between the side walls of the combustion cup and diffuser and with the end walls of the combustion cup and diffuser in overlapping engagement and the step of welding the end walls of the combustion cup and diffuser together;
said step of positioning the combustion cup in the diffuser including positioning the combustion cup in the diffuser with a flange at an end of the combustion cup side wall opposite from the one end of the combustion cup side wall in engagement with a flange at an end of the diffuser side wall opposite from the one end of the diffuser side wall, said step of interconnecting a combustion cup and a diffuser further comprising the step of welding the flanges of the combustion cup and diffuser together.

29. A method as set forth in claim 28, said step of connecting an initiator assembly to the closure member being prior to welding the closure member to the interconnected combustion cup and diffuser, said step of welding the closure member to the interconnected combustion cup and diffuser including welding the closure member to the combustion cup flange with the initiator assembly connected to the closure member.

* * * * *

UNITED STATES PATENT AND TRADEMARK OFFICE
CERTIFICATE OF CORRECTION

PATENT NO. : 5,199,741

DATED : April 6, 1993

INVENTOR(S) : Timothy A. Swann, John P. O'Loughlin and Jerome W. Emery

It is certified that error appears in the above-identified patent and that said Letters Patent is hereby corrected as shown below:

Column 10, line 49, change "form" to -- from --.

Column 11, line 49, after "on" insert -- one --.

Signed and Sealed this

Fourth Day of January, 1994

Attest:

BRUCE LEHMAN

Attesting Officer

Commissioner of Patents and Trademarks